United States Patent [19]

Taniguchi et al.

[11] Patent Number: 4,670,746
[45] Date of Patent: Jun. 2, 1987

[54] KEYLESS ENTRY SYSTEM FOR AUTOMOTIVE DEVICES WITH FEATURE FOR GIVING CAUTION FOR LOCKING WIRELESS CODE TRANSMITTER IN VEHICLE

[75] Inventors: Yoshiyuki Taniguchi, Yokosuka; Motoki Hirano, Yokohama, both of Japan

[73] Assignee: Nissan Motor Company, Limited, Yokohama, Japan

[21] Appl. No.: 651,785

[22] Filed: Sep. 18, 1984

[30] Foreign Application Priority Data

Sep. 19, 1983 [JP] Japan ................... 58-172681

[51] Int. Cl.⁴ .......................... G06F 7/04; B60R 25/04; B60Q 1/00
[52] U.S. Cl. ..................... 340/825.31; 340/825.69; 340/52 D; 70/257; 180/287; 307/10 AT
[58] Field of Search ................ 340/825.3, 542, 52 D, 340/825.32, 825.69, 572, 825.54, 825.76, 528, 63, 64, 65, 825.31, 825.72; 70/252, 256, 257; 180/287; 307/10 AT

[56] References Cited

U.S. PATENT DOCUMENTS

| | | | |
|---|---|---|---|
| 3,196,440 | 7/1965 | Weinstein | 340/825.72 |
| 3,723,967 | 3/1973 | Atkins et al. | 340/64 |
| 3,866,168 | 2/1975 | McGuirk, Jr. | 307/10 AT |
| 3,891,980 | 6/1975 | Lewis et al. | 340/572 |
| 4,137,985 | 2/1979 | Winchell | 307/10 AT |
| 4,205,325 | 5/1980 | Haygood et al. | 340/825.32 |
| 4,223,296 | 9/1980 | Kim et al. | 340/52 D |

FOREIGN PATENT DOCUMENTS 0123538 9/1980 Japan .................. 340/52 D

Primary Examiner—Ulysses Weldon
Assistant Examiner—Ralph Smith
Attorney, Agent, or Firm—Schwartz, Jeffery, Schwaab, Mack, Blumenthal & Evans

[57] ABSTRACT

A keyless entry system can lock and unlock an automotive vehicle door, a trunk lid, a glove box and/or a steering column without an ignition key. The system comprises a transmitter producing a radio signal indicative of a preset unique code, and a controller receiving the radio signal and performing desired locking or unlocking operation when the code from the transmitter matches a preset code. A manual switch is provided to order the transmitter to transmit the code-indicative radio signal to the controller. The transmitter encloses a battery acting as a power source. Locking the transmitter in the vehicle is detected by detecting that the code signal level remains substantially unchanged for a given period of time after the vehicle is locked. In such cases, an alarm is produced to remind the driver to remove the transmitter from the vehicle cabin by operating the manual switch to open the door. An optional feature disables the keyless entry system if the driver fails the retrieve the transmitter after the alarm.

18 Claims, 8 Drawing Figures

KEYLESS ENTRY SYSTEM FOR AUTOMOTIVE DEVICES WITH FEATURE FOR GIVING CAUTION FOR LOCKING WIRELESS CODE TRANSMITTER IN VEHICLE

BACKGROUND OF THE INVENTION

The present invention relates generally to a unique and novel keyless entry system for operating automotive devices, such as door locks, a trunk lid lock, a glove box lid lock, steering lock devices and/or a starter motor without mechanical keys. More specifically, the invention relates to a keyless entry system which comprises a wireless transmitter transmitting a preset code to a controller which actuates the automotive devices when the code from the transmitter matches a preset code stored in the controller. Additionally, the invention relates to an alarm or cautioning means associated with the keyless entry system for producing an alarm or a caution when a user leaves the transmitter in the passenger compartment and starts to leave the vehicle.

U.S. Pat. No. 4,205,325, to Haygood et al, discloses a keyless entry system for an automotive vehicle permitting a plurality of operations to be achieved from outside the vehicle by one who is knowledgeable of predetermined digital codes. Functions such as unlocking the doors of the vehicle, opening the rear trunk lid, opening a roof window, lowering the windows or programming the system with a user-preferred digital access code can all be performed by proper sequential operation of a digital keyboard mounted on the outside of the vehicle.

This and other conventional keyless entry systems require the user to accurately input the predetermined code through the keybord. Although such keyless entry systems have been well developed and considered useful for eliminating the need for mechanical keys, a serious problem may occur when the user of the vehicle forgets the predetermined code. If the user is outside of the vehicle and the vehicle door lock device is holding the doors locked, the user cannot unlock the door locks until he remembers the predetermined code.

The present invention provides a novel and more useful system for operating the vehicle devices without an ignition key and without requiring manual entry of a predetermined code.

SUMMARY OF THE INVENTION

Therefore, it is an principle object of the present invention to provide a unique and novel keyless entry system which requires no mechanical key operations or manual entry of a preset code.

Another and more specific object of the present invention is to provide a keyless entry system including an electronic controller which actuates an automotive device in response to a preset code-indicative signal transmitted by a wireles signal transmitter.

A further object of the present invention is to provide an alarm or caution system which notifies the vehicle user of cases where the transmitter remains inside the passenger compartment while the user is preparing to leave the vehicle.

In order to accomplish the aforementioned and other objects, a keyless entry system, in accordance with the present invention, generally comprises a wireless code transmitter which is portable by hand or in pockets and has an enclosed battery acting as a power source, and a controller connected to vehicle devices to electrically operate the latter in response to a preset code transmitted from the transmitter. The transmitter transmits a code signal to the controller when one of the vehicle devices is to be operated. The controller is responsive to the code signal when the transmitted code matches a preset code to produce a driver signal which actuates the designated vehicle device.

In the preferred structure, a switch which activates the transmitter is provided on the external surface of the vehicle body and is connected to the controller. When the switch is thrown, the controller transmits a demand signal to the transmitter possessed by the user. The transmitter responds to the demand signal by transmitting the code signal to the controller.

Another and important feature of the invention is to provide a caution system which detects when the transmitter is locked in the vehicle, and produces an alarm in such cases.

In the preferred construction, the caution means monitors the amplitude of the signal receiver from the transmitter and produces an alarm when the signal level remains within a given range for a given period of time. The given period of time is selected to be long enough for the user to walk a certain distance away from the vehicle but short enough to produce the alarm before the user goes too far away to notice the alarm.

According to one aspect of the invention, a keyless entry system for operating an automotive vehicle device without a mechanical key comprises an electrical actuator associated with the lock device and responsive a control signal to reverse the position of the lock device, a manual switch manually, a transmitter activated by manual operation of the manual switch to output a radio signal indicative of a unique code which identifies the transmitter, a battery for supplying electric power to the transmitter, a controller for receiving the radio signal from the transmitter, comparing the unique code indicated by the radio signal with a preset code, and producing the control signal when the unique code matches the preset code, and a transmitter-locking alarm means, associated with the controller, for detecting when the transmitter is locked in the vehicle and producing an alarm in such cases.

According to another aspect of the invention, a keyless entry system for an automotive vehicle for operating one of a plurality of vehicle devices including a door lock device which is selectively operated to either of a first locked position or a second unlocked position, comprises a plurality of electrical actuators respectively associated with the corresponding vehicle devices and responsive a control signal to operate the corresponding vehicle device to desired positions, a plurality of manual switches, each adapted to be operated for operating one of the corresponding vehicle devices, a transmitter activated by manual operation of one of the manual switches to output a radio signal indicative of a unique code which identifies the transmitter, a controller for receiving the radio signal from the transmitter, comparing the unique code indicated by the radio signal with a preset code, and producing the control signal when the unique code matches the preset code, the controller including means responsive to manual operation of one of the manual switch for identifying one of the actuators to be operated and operating the identified actuator for operating one of the vehicle devices corresponding to the manual switch operated, and a transmitter-locking alarm means, associated with the controller, for detecting when said transmitter is locked in the vehicle and producing an alarm in such cases.

BRIEF DESCRIPTION OF THE DRAWINGS

The present invention will be understood more fully from the detailed description given below and from the accompanying drawings of the preferred embodiment of the present invention, which, however, should not be assumed to limit the invention to the specific embodiments but are for explanation and understanding only.

In the drawings.

DESCRIPTION OF THE PREFERRED EMBODIMENT

Figure 1:
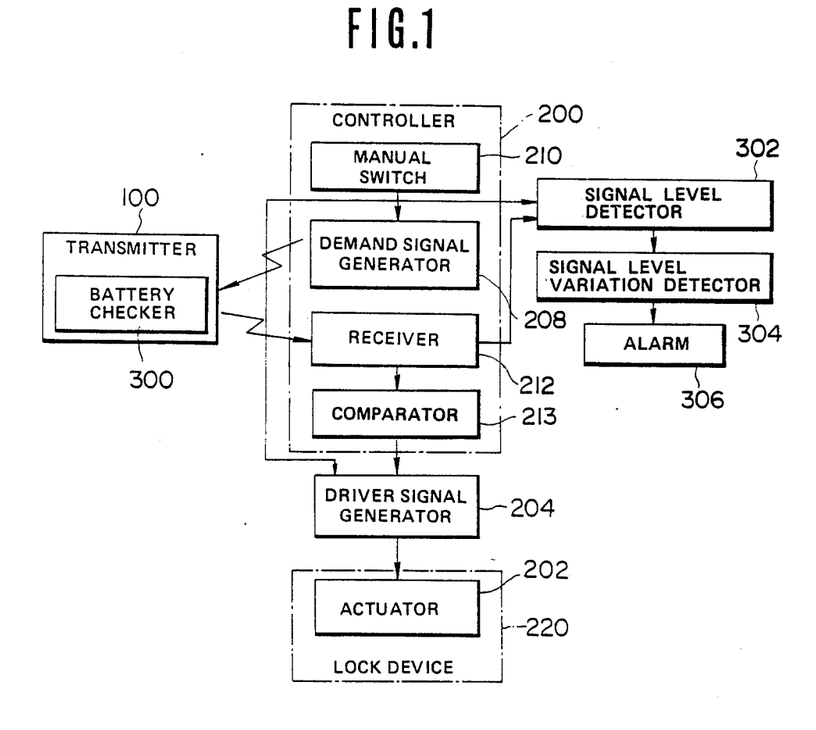
FIG. 1 is a schematic block diagram showing the general concepts of a keyless entry system for an automotive vehicle device according to the present invention.
Figure 2:
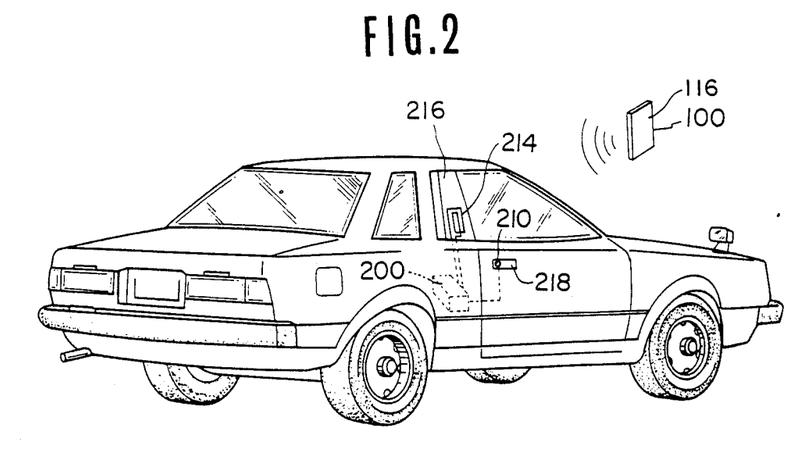
FIG. 2 is a perspective view of an automotive vehicle to which the keyless entry system according to the present invention is applied.

Referring now to the drawings, particularly to FIGS. 1 and 2, the preferred embodiment of a keyless entry system for an automotive vehicle according to the present invention generally comprises a code transmitter 100 and a controller 200. The controller 200 is connected via a driver signal generator 204 to actuators 202 for vehicle devices such as a door lock device, a trunk lid lock device, a starter motor and a steering lock device.

The controller 200 includes a demand signal generator 208 which sends a demand signal $S_D$ to the transmitter 100 to activate the latter. The demand signal generator 208 is connected to one or more manual switches 210 which are placed on the external surface of the vehicle so as to be accessible from outside the vehicle. The demand signal generator 208 produces a demand signal $S_D$ when one of the manual switches 210 is depressed.

Figure 3:
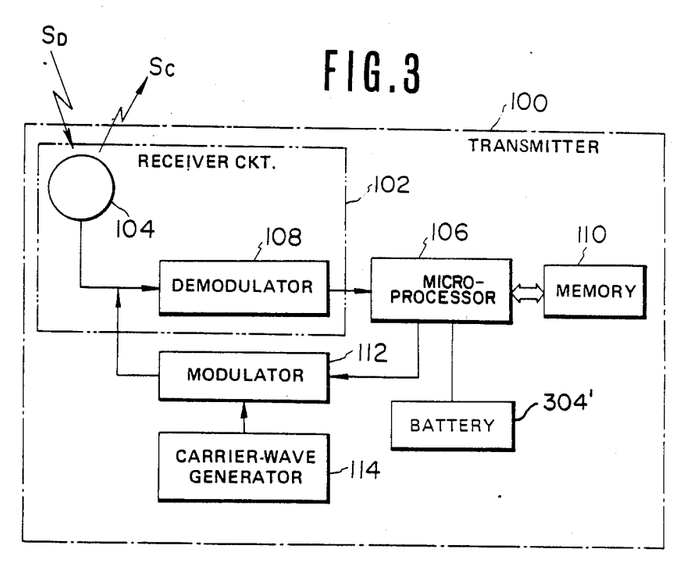
FIG. 3 is a block diagram of a transmitter in the preferred embodiment of a keyless entry system according to the present invention.

As shown in FIG. 3, the transmitter 100 includes a receiver circuit 102 for receiving the demand signal $S_D$ from the controller. The transmitter 100 becomes active when the receiving circuit 102 receives the demand signal $S_D$ to produce a code signal $S_C$ which is indicative of a preset specific code. The preset code of the portable transmitter 100 differs from that of the demand signal generator 208 so that the controller 200 can recognize when the transmitter 100 is responding.

As shown in FIG. 3, the transmitter 100 encloses a thin, compact, long-life battery 304, such as a mercury battery, acting as a power source. The battery 304' is connected to a transmitter circuit to supply electric power.

The transmitter 100 continuously transmits the code signal $S_C$ to the controller for as long as it remains active. The code signal $S_C$ is received by a receiver 212 in the controller 200. The controller 200 has a comparator 213 to compare the received code with a specific preset code. When the received code matches the code preset as compared in the comparator 213, the controller 200 sends a control signal SL to the driver circuit generator 204. The driver signal generator 204 in turn sends a drive signal to one of the actuators 202 corresponding to the manual switch 120 operated. The actuator 202 in activated by the driver signal from the driver signal generator 204 to operate the corresponding vehicle device.

The receiver 212 of the controller 200 is connected to a signal level detector 302 of a transmitter-locking alarm system. The signal level detector 302 monitors the amplitude of the code signal SC from the transmitter 100 and produces a signal-level-indicative signal having a value which varies in proportion to the amplitude of the code signal. A signal level variation detector 304 is associated with the signal level detector 302 to detect the degree of change in the signal level within a given period of time. The signal level variation detector a detected signal level variation value with a reference value which is indicative of the expected reduction in the amplitude of the code signal within the given period as the user carries the transmitter away from the vehicle. The signal level variation detector 304 produces an alarm signal when the magnitude of the signal level variation is less than the reference value. The alarm signal produced by the signal level variation detector 304 is fed to an alarm device 306 which then produces an alarm or a caution to notify the user that the transmitter 100 is still locked in the vehicle.

Since the door lock device can be operated by depressing the manual switch 210 which causes transmission of the demand signal from the controller 200 to the transmitter placed inside of the vehicle and of the code signal from the transmitter to the controller, the user can easily remove the transmitter 100 from the passenger compartment even if the transmitter 100 should be inadvertently locked in the vehicle.

It should be appreciated that, since the vehicle devices to be operated by the first embodiment of the keyless entry system are two-state locking devices for locking and unlocking vehicle doors, the trunk lid and the steering column and two-state starter motor, the actuators 202 actuate the vehicle devices from the current position to the opposite position in response to the driver signal. For instance, when the vehicle device is in the locked position, the actuator unlocks the vehicle device in response to the driver signal. On the other hand, when the driver signal is sent to the actuator of a vehicle device which is currently unlocked, that vehicle device is then locked.

The transmitter 100 includes a transmitter/receiver antenna 104. In addition, a loop antenna 214 is built into one of the windows 216 of the vehicle. The loop antenna 214 transmits the demand signal $S_D$ to and receives the code signal $S_C$ from the transmitter 100. As shown in FIG. 2, the manual switches 210 are mounted on an escutcheon 218 of an outside door handle for operation from outside the vehicle.

On the other hand, when the vehicle device is the starter motor which is normally off, the actuator turns the starter motor on for the period of time wherein the driver signal is applied thereto. Therefore, the starter motor is operated for the predetermined period of time in which the driver signal remains HIGH.

The transmitter 100 is housed in a case small enough to hand-carry or to pocket.

FIG. 3 shows the circuit structure of the transmitter 100. A microprocessor 106 is connected to the antenna 104 via a demodulator 108 which demodulates the received demand signal $S_D$, and to the battery 304' via to receive power therefrom. The microprocessor 106 includes a memory 100 storing the preset code. In response to the demand signal $S_D$, the microprocessor 106 reads out the preset code to a modulator 112. The modulator 112 is, in turn, connected to a carrier-wave generator 114 to receive a carrier wave. The modulator 112 modulates the carrier-wave with the code-indicative signal from the microprocessor 106 to produce the final code signal $S_C$.

In the preferred embodiment, the antenna 104 of the transmitter 100 is built into the transmitter circuit board or on the surface of the transmitter casing 116 (shown in FIG. 2). The casing 116 is the size of a name card and thin enough to carry in a shirt pocket.

Figure 4:
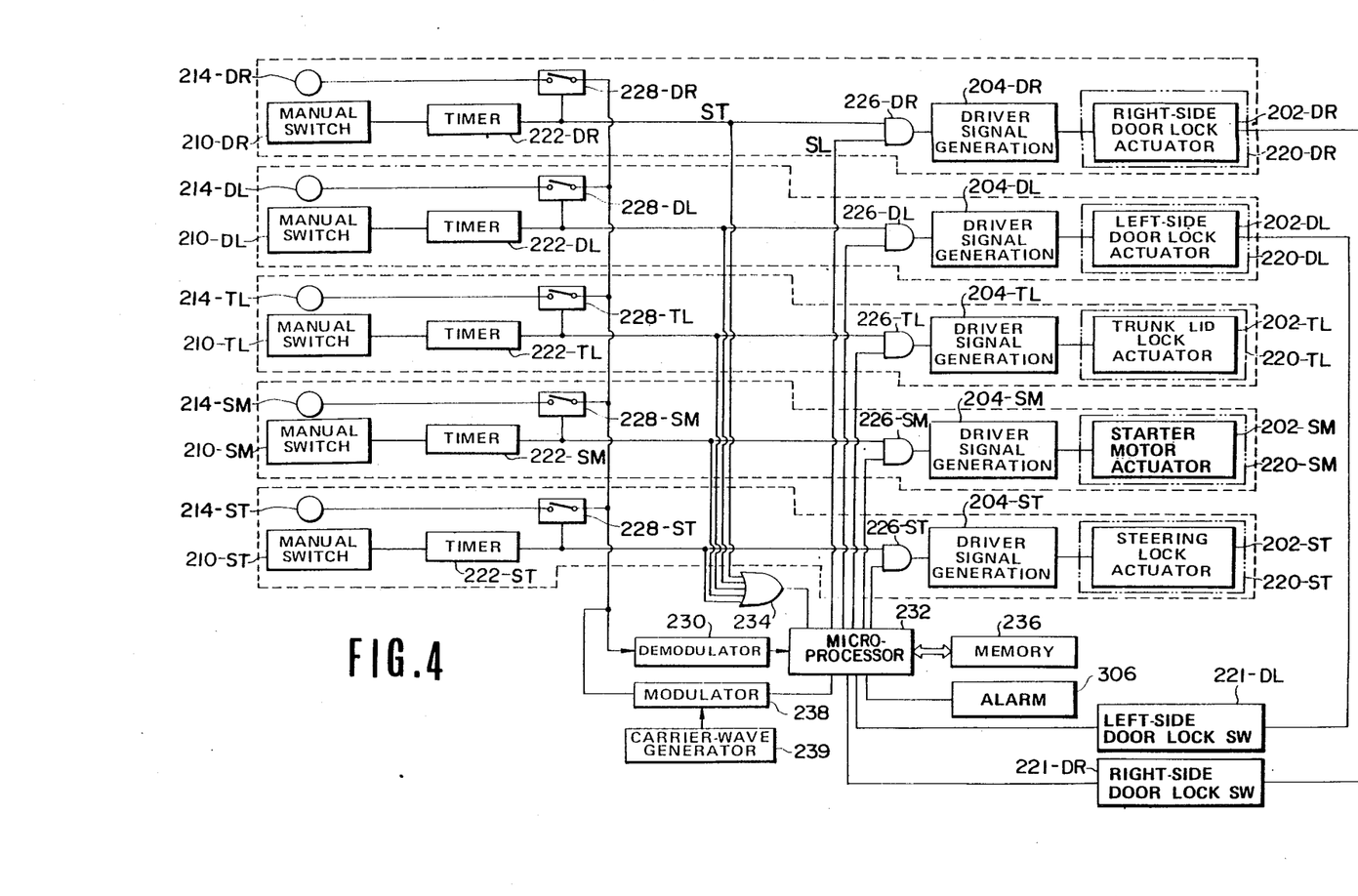
FIG. 4 is a block diagram of a controller in the preferred embodiment of the keyless entry system according to the present invention.

FIG. 4 shows the circuitry of the controller 200. As set forth above, the embodiment shown of the keyless entry system is adapted to operate the door locks, the trunk lid lock, the starter motor and the steering lock device. In addition, the embodiment shown is adapted to control operation of the locks for the right- and left-side doors independently. In order to allow independent operation of the lock devices, manual switches 210-DR, 210-DL, 210-TL, 210-SM and 210-ST are provided on the vehicle body somewhere nearby the devices to be operated. For example, the manual switches 210-DR and 210-DL are provided adjacent the door handles of respectively corresponding side doors. Similarly, the manual swtich 210-TL to operate the trunk lid lock device would be placed adjacent the trunk lid.

Though the specific embodiment has been illustrated to locate respective manual switches adjacent the corresponding vehicle devices to be operated, it would be possible to provide all of manual switched in a concentric manner on the outside door handle escutcheon 218, for example.

Each manual switch is operable independently to operate the corresponding lock deivce. For example, when the manual switch 210-DR is depressed, the right-side door lock 220-DR is actuated to either to the locked or unlocked state.

Each manual switch 210-DR, 210-DL, 210-TL, 210-SM and 210-ST is connected to a timer 222-DR, 222-DL, 222-TL, 222-SM and 222-ST through a normally closed (not shown) relay. The timers, which will be referred to generically with reference numeral "222", are responsive to depression of the corresponding manual switch, which will be referred to generically with reference numeral "210", to produce a HIGH-level timer signal St for a given period of time. This given period of time should be long enough to cover the time required to transmit the demand signal $S_D$ from the controller to the transmitter 100 and to receive the code signal $S_C$ from the transmitter in return. The timer signal St is fed to a corresponding AND-gate 226-DR, 226-DL, 226-TL, 226-SM and 226-ST, which will be referred to generically with reference numeral "226". At the same time, the timer signal St is fed to a corresponding switching circuit 228-DR, 228-DL, 228-TL, 228-SM and 228-ST, which will be referred to generically with reference numeral "228". The switching circuit 228 closes in response to the timer signal St to connect the corresponding antenna 214-DR, 214-DL, 214-TL, 214-SM or 214-ST, which will be referred to generically with reference numeral "214", to a demodulator 230, whereby the code signal $S_C$ recieved by the corresponding antenna 214 is conducted to the demodulator. The timers 222 are also all connected to a microprocessor 232 via a multi-input OR gate 234. The microprocessor 232 includes a memory 236 which stores the preset code corresponding to that stored in the transmitter 100.

The microprocessor 232 responds to the timer signal St received via the OR gate 234 by outputting the demand signal $S_D$ to the transmitter through a modulator 238 and antenna 214. The modulator 238 is connected to the antennae 214 via the switching circuits 228 to transmit the demand signal $S_D$ to the transmitter 100. The microprocessor 232 receives the code signal $S_C$ via the antenna 214 and the demodulator 230 and compares the received code with the stored code. When the received code matches the stored code, the microprocessor 232 outputs the control signal SL to the other input terminal of the AND gate 226 corresponding to the depressed manual switch. Therefore, at this time, AND gate 226 transmits a HIGH-level signal to the driver signal generator 204-DR, 204-DL, 204-TL, 204-SM or 204-ST, which will be referred to generically with reference numeral "204". The driver signal generator 204 responds to the HIGH-level signal by outputting a driver signal to the corresponding actuator 202-DR, 202-DL, 202-TL, 202-SM or 202-ST of the lock 220-DR, 220-DL, 220-TL, 220-SM or 220-ST.

The door locks 220-DR and 220-DL are connected to right- and left-side door lock switches 221-DR and 221-DL which turns ON when corresponding door lock is in locking state. The door lock switches 221-DR and 221-DL are connected to the microprocessor 232 to feed HIGH level door locking state indicative signals.

The vehicle devices 220 also allows operations in a conventional mechanical key. When the mechanical key is used, the vehicle devices are operated independently of the keyless entry system.

Figure 5A:
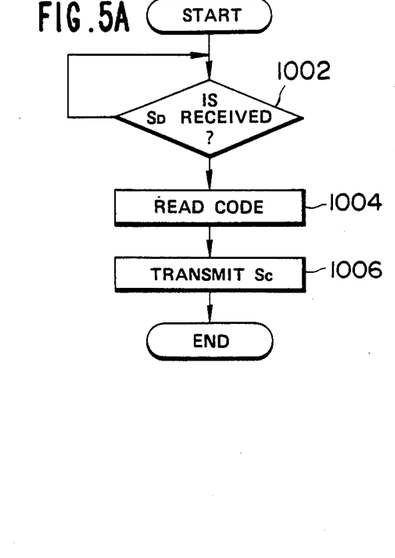
FIGS. 5(A) and 5(B) are flowcharts of the operation of the transmitter and the controller, respectively.

The microprocessor 106 of the transmitter 100 repeatedly executes the first control program illustrated in FIG. 5(A). In the first control program, the microprocessor 106 checks for receipt of the demand signal $S_D$ from the controller at a step 1002. The step 1002 is repeated until the demand signal $S_D$ is received. In other words, the transmitter 100 normally remains in a stand-by state, waiting to produce the code signal $S_C$ in response to the demand signal $S_D$.

When the demand signal $S_D$ is detected at the step 1002, the preset code $C_1$ is read from memory 110 at a step 1004. The microprocessor 106 then outputs the code-indicative signal to the modulator 112 which in turn outputs the code signal $S_C$ in step 1006. Control then returns to the stand-by step 1002.

It should be noted that the code signal $S_C$ is transmitted from the modulator to the controller for a given period of time and terminates when the given period of time expires. The given period of time during which the code signal $S_C$ is transmitted is so chosen that the controller 200 can activate the actuator 202 designated by the operated manual switch before expiration of that period. In addition, the code stored in the memory 110 is preferably a binary code, such as an 8-bit serial datum. This binary code rides on the carrier wave as modulated by the modulator to form the code signal $S_C$.

The microprocessor 232 is programmed to sample the amplitude of the received code signal at a first timing upon initial receipt of the code signal and at a second timing a given period of time after the first timing. The microprocessor 232 derives the differences between the amplitudes of the received signals at the first and second timings. The derived amplitude difference is compared with the reference value representing the expected code signal amplitude reduction in cases where the transmitter 100 is not locked in the vehicle. If the difference is less than the reference value, the microprocessor 232 outputs an alarm signal to the alarm device 306 to activate the latter.

The operation of the microprocessors in the transmitter 100 and the controller 200 will be described in more detail with reference to flowcharts of control programs executed thereby. The flowchart of FIG. 5(A) summarizes the first control program executed by the microprocessor 106 in the transmitter 100, and the flowchart of FIG. 5(B) summarizes the second control program executed by the microprocessor 232 of the controller 200.

Figure 5B:
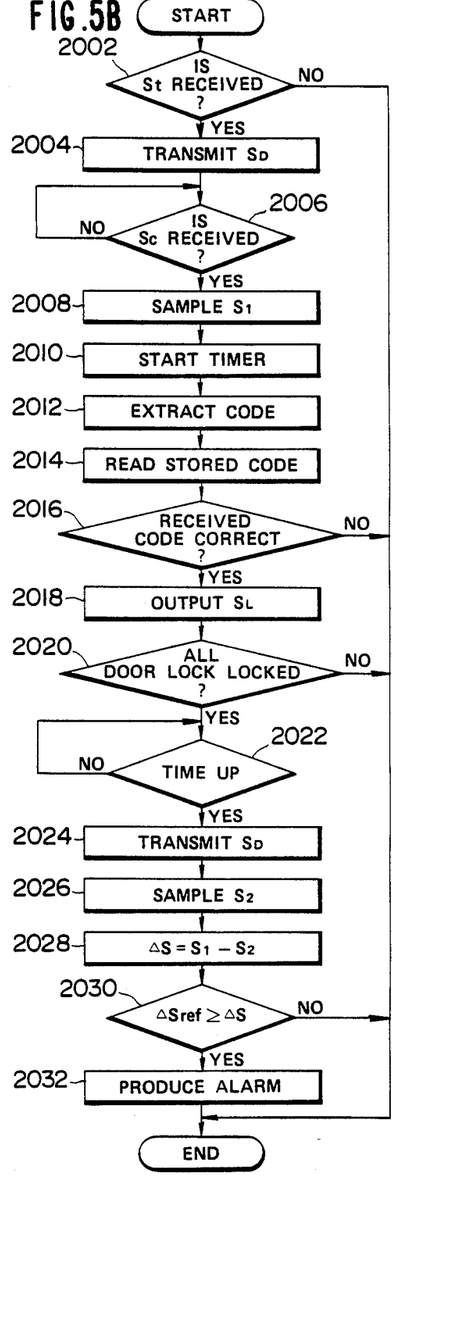

FIG. 5(B) is a flow chart of a program executed concurrently and independently of the that illustrated in FIG. 5(A). In initial step 2002, the ouput of OR-gate 234 is checked to determine if any of the manual switches 210 have been depressed. If not, the program ends and is repeated again from the beginning. If one or more of the manual switches 210 has been closed, control passes to step 2004 wherein the demand signal $S_D$ is broadcast for reception by the transmitter 100. Thereafter, the microprocessor 232 waits at step 2006 for receipt of the code signal $S_C$ from transmitter 100. Upon receipt of code signal $S_C$, its amplitude $S_1$ is recorded in step 2008 for later use and then a read-time counter or timer is reset and started in step 2010. In this embodiment, the timer clocks a predtermined period of time which is long enough for the signal level from a slowly receeding transmitter to diminish noticeable, but not so long as to allow a walking driver to leave sight or earshot of the vehicle and its alarm device 306.

Following step 2010, the demodulator 230 and microprocessor 232 extract the coded information from the code signal $S_D$ in step 2012. The analogous code information is then retrieved from memory 236 in step 2014 for verification of the received code. If the recieved code matches the stored code when checked in subsequent step 2016, then the vehicle device associated with the particular manual switch closed in step 2002 is actuated in step 2018. An incorrect code match at step 2016 causes the current cycle of program execution to end.

Of the steps executed up to this point, only step 2010 is directly concerned with checking for a transmitter left in the passenger compartment by a forgetful driver. In fact, if the program were to end here, bypassing the subsequent steps 2022-2032, the keyless entry system could still function satisfactorily, although without the alarm feature described later. This would actually be preferrable in cases where only the glove box, trunk, starter, or the like are being used, as in such cases there is no chance of the driver leaving without the transmitter and an alarm to that effect would only be a nuisance. Accordingly, in step 2020 following actuation step 2018, the door switch positions are checked to check if all of the doors are locked. If all the doors are locked, the program continues to step 2022 et seq., as this is the only instance in which an alarm might be useful. Although which device is to be actuated and its state of actuation at any time are not easy to check in the circuit shown in FIG. 4, modern vehicles commonly have accessory safety systems which monitor door locks and the like, and such a system may be used to detect when the driver's door or other doors are being locked. Of course, step 2020 may be omitted altogether.

In step 2022, the microprocessor 232 waits for the timer activated in step 2010 to count out the predetermined period of time. After this period has elapsed, the demand signal $S_D$ is again transmitted in step 2024 to elicit the code signal $S_C$ from transmitter 100. The amplitude $S_2$ of the received code signal is again sampled in step 2026, and this value is subtracted from or divided into the signal amplitude value $S_1$ recorded earlier to obtain an amplitude change value $\Delta S$ in step 2028. The amplitude change value $\Delta S$ is then compared in step 2030 to a reference amplitude change value $\Delta S_{ref}$ which represents a minimal expectable drop in the signal level of the code signal $S_C$ if the transmitter 100 were being carried away from the vehicle. If the detected change $\Delta S$ matches or exceeds the predetermined threshold value $\Delta S_{ref}$, then it can be assumed that the driver has taken the transmitter with him or her, and the program ends without further operation. Otherwise an alarm is produced in step 2032 to warn the driver of his/her impending mistake.

It should be noted that the predetermined period of time spent predominantly at step 2022 needs to be selected suitably, but that this can be done with confidence. Specifically, since the transmitter 100 will be quite close to the antennas 214 when the manual switch 210 is first depressed and the transmitted signal level will drop off with the square of the distance from the vehicle thereafter, a significant amplitude drop should be resolvable after only a short time.

In the shown embodiment as set forth above, since the code signal $S_C$ is output only when the demand signal $S_D$ is input from the controller, consumption of electric power of the battery in the transmitter is significantly reduced in comparison with system which might employ constant transmission of the code signal $S_C$. Thus, the life-time of the battery of the transmitter is prolonged even though electric power is constantly supplied to the microprocessor to hold same in stand-by. It should be appreciated that the electric power needed to power the microprocessor is substantially smaller than that consumed in transmitting the code signal $S_C$. Therefore, constant power supply to the microprocessor will not significantly affect the lift-time of the battery.

Similarly, since the demand signal $S_D$ is produced only when at least one of the manual switches is depressed, consumption of the electric power by the controller is significantly limitted.

It is also to be noted that transmission of the demand signal $S_D$ and the code signal $S_C$ is performed by electromagnetic induction. Since locking and unlocking operations of the lock devices will generally be performed only when the transmitter is near the controller, good communication between the transmitter and the controller can be obtained by electromagnetic induction without significant power consumption.

In order to unlock the right-side door lock device 220-DR, the manual switch 210-DR is depressed. When the ignition switch 320 is in the OFF position, the timer 222-DR becomes active to output the timer signal St. The timer signal St is applied to the AND gate 226 DR and to the switching circuit 228-DR, the latter of which then closes to connect the antenna 214-DR to the microprocessor 232.

The time signal St from the timer 222-DR is also input to the microprocessor 232 via the OR gate 234. The microprocessor 232 responds inputs from the OR gate 234 by activating the modulator 238 to transmit the demand signal $S_D$ via the antenna 214-DR.

The demand signal $S_D$ transmitted via the antenna 214-DR is received by the antenna 104 of the transmitter 100. Then, the demand signal $S_D$ is demodulated by the demodulator 108 to remove the carrier-wave components. The microprocessor 106 of the transmitter 100 then executes the steps 1004 and 1006 of the first control program of FIG. 5(A) and outputs the code-indicative signal to the modulator 112. The modulator 112 thus transmits the code signal $S_C$ to the controller 200 via the antenna 104.

The code signal $S_C$ is received by the antenna 214-DR and fed to the demodulator 230. The demodulator 230 demodulates the code signal $S_C$ to remove the carrier-wave components. The microprocessor 232 receives the demodulated code signal $S_C$ and executes the steps 2008 to 2016 of the second control program. When the input code matches the preset code in the memory 236, the microprocessor 232 feeds the control signal SL to the AND gate 226-DR. At this time, since the timer signal St is still being applied to one of the input terminals of the AND gate, the AND condition of the timer signal St and the control signal SL is established and as a result, the AND gate passes a HIGH-level signal to the driver signal generator 204-DR which produces the driver signal. The driver signal is applied to the actuator 202-DR of the right-side door lock device 220-DR to reverse the lock position. Since the right-side door lock device 220-DR was originally locked, it becomes unlocked upon activation of the actuator 202-DR.

Similarly, when the manual switch 210-DL is closed to operate the left-side door lock device, the antenna 214-DL sends the code signal $S_C$ to the microprocessor. If the input code matches the preset code, the AND gate 226-DL opens to activate the driver signal generator 204-DL. Thus, if the left-side door lock device is originally unlocked, it becomes locked.

When the manual switch 210-TL is operated, the timer 222-TL become active to send a timer signal St to the AND gate 226-TL and the switching circuit 228-TL. The switching circuit 228-TL then closes to establish electrical communication between the antenna 214-TL and the demodulator 230 and the modulator 238. The code signal $S_C$ is transmitted from the transmitter 100 to the antenna 214-TL in response to the demand signal $S_D$. If the input code is the same as the preset code, then the AND gate 226-TL opens to activate the driver signal generator 204-TL. Therefore, the trunk lid lock device 220-TL switches from its current position to the other position.

When the manual switch is operated to open the glove box lid, the associated timer is activated to output the timer signal St. In response to the timer signal St, the associated switching circuit establishes electrical communication between the associated antenna and the demodulator 230. The code signal $S_C$ transmitted from the transmitter 100 is thus demodulated by the demodulator and input to the microprocessor 232. The AND gate opens in response to the control signal SL from the microprocessor 232 to activate the driver signal generator by the gate signal thereof. In response to the driver signal from the driver signal generator, the actuator becomes active to reverse the position of the glove box lid lock from locked state to the unlocked state to allow access to the glove box. The elements of the manual switch, timer, switching circuit, antenna, AND gate, driver signal generator and actuator for the glove box lid are not shown in FIG. 4 but these elements are connected in the same manner as the corresponding door lock elements.

In order to release the steering wheel from the locked state, the manual switch 210-ST is depressed. The timer 222-ST becomes active to output the timer signal St for the given period of time. During the period of time in which the timer 222-ST is active, the antenna 214-ST is connected to the microprocessor 232 via the demodulator 230 to receive the code signal $S_C$ from the transmitter 100. When the input code matches the preset code in the memory 236, the driver signal generator 204-ST outputs the driver signal to reverse the position of the steering lock device 200-ST from the locked state to the unlocked state.

Figure 6A:
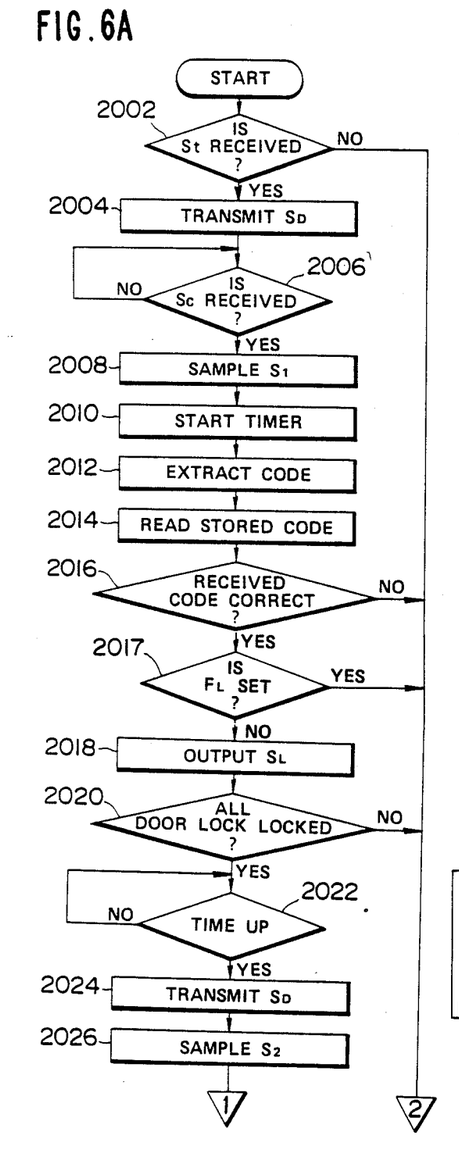
FIGS. 6(A) and 6(B) are flowcharts showing a modified mode of operation of the transmitter and the controller, respectively.
Figure 6B:
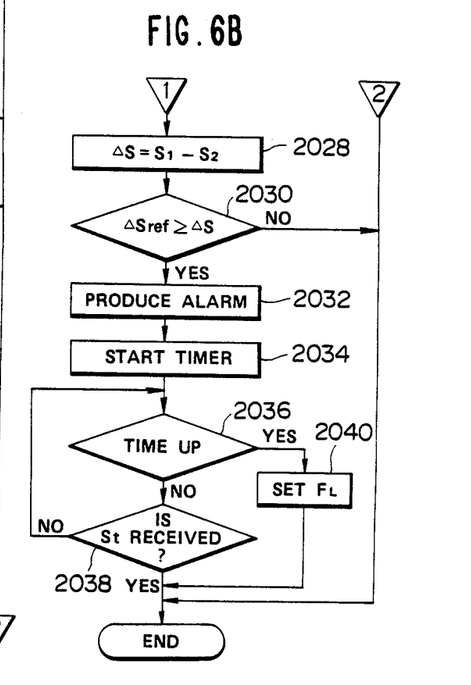

FIG. 6 is a flowchart of a modified version of the program illustrated in FIG. 5(B), from which it differs only by the inclusion of steps 2017 and 2034–2040. These added steps enhance the alarm feature of FIG. 5(B) by locking up the keyless entry system in cases where an alarm is produced in step 2032 but not heeded, so that the transmitter 100 remains locked inside the vehicle. This lock-up feature prevents unauthorized entry via the manual switches 210, forcing the vehicle user to re-enter the vehicle by means of conventional mechanical keys after forgetting the transmitter.

Step 2017 is inserted between steps 2016 and 2018 and serves to prevent actuation of any vehicle devices by means of the keyless entry system in cases of lock-up. Specifically, a lock-up flag $F_L$ is checked at step 2017 and if set, the program ends rather than proceeding to step 2018. The flag $F_L$ is normally reset, allowing normal program flow from step 2016 to step 2018, and can only be set in step 2040 described below.

Step 2034 follows step 2032. After the alarm is produced, the timer is restarted in step 2034 to clock a second predetermined period of time allowed for the driver to re-enter the vehicle and retrieve the transmitter. In subsequent step 2036, the time value is checked to see if the second period has expired. During the second period, control passes from step 2036 to step 2038, in which the ouptut of OR-gate 234 is again checked to see if any manual switches are being operated. If so, the current program cycle ends; otherwise, control returns to step 2036. After the second period has expired without actuation of any of the manual switches 210, control passes from step 2036 to step 2040, in which lock-up flag $F_L$ is set. Thereafter, the program ends and step 2017 takes effect, locking up the keyless entry system.

When the keyless entry system is disabled as set forth above, the vehicle devices, i.e. door locks, trunk lid lock, and so forth, are operated by means of a mechanical key.

For operating a plurality of vehicle devices, the antenna can be mounted various portion of the vehicle body, which portions are stable and cannot move. For example, the antenna 214-TL for operating the trunk lid lock device may be provided on the rear windshield or the edge of rear windshield opening. Similarly, antennas 214-ST and 214-SM for steering lock device and the starter motor may be mounted on the front windshield or along the edge of the front windshield opening.

As will be appreciated herefrom, according to the present invention, the use is now free of the responsibility of memorizing the preset code and need only depress a manual switch corresponding to the desired lock device to be operated. In addition, according to the present invention, locking the transmitter in the vehicle can be successfully prevented by producing an alarm when the code signal level is remains substantially unchanged.

Therefore, the invention fulfills all of the objects and advantages sought therefor.

What is claimed is:

1. A keyless entry system for an automotive vehicle lock device for selectably actuating the lock device to either of a first locked position and a second unlocked position, comprising:
    an electrical actuator associated with said lock device and responsive to a control signal to reverse the position of said lock device;
    a manual switch;
    a transmitter for transmitting a radio signal indicative of a unique code which identifies the transmitter, when said manual switch is operated and in response to a demand signal received by said transmitter;
    a controller producing said demand signal in response to manual operation of said manual switch for activating said transmitter, said controller operable for receiving said radio signal from said transmitter, comparing the unique code indicated by said radio signal with a preset code, and producing said control signal when said unique code matches said preset code; and
    a transmitter-locking alarm means, associated with said controller, for detecting when said transmitter is locked in the vehicle and producing an alarm in such cases.

2. The keyless entry system as set forth in claim 1, wherein said transmitter is portable and said controller is mounted on a vehicle and associated with said manual switch, and said demand signal is another radio signal transmitted from said controller to said transmitter.

3. The keyless entry system as set forth in claim 2, wherein said transmitter and said controller each include an antenna and wherein electromagnetic induction between said antennae allows transmission of said radio and another signals.

4. The keyless entry system as set forth in claim 1, further including a plurality of devices to be operated independently of each other, a plurality of actuators, each operating a corresponding one of said devices, and a plurality of switch elements, each operating a corresponding one of said actuators to operate said corresponding devices.

5. The keyless entry system as set forth in claim 4, wherein said controller further comprises means, associated with said switch elements, for identifying each of the devices corresponding to each the switch elements operated.

6. The keyless entry system as set forth in claim 5, wherein said lock device comprises a door lock, a trunk lid lock, a glove box lid lock and a steering lock device, and said manual switch includes a plurality of switch elements each of which corresponds to one of said lock devices.

7. The keyless entry system as set forth in claim 4, wherein each manual switch is provided on the vehicle body adjacent to the corresponding device.

8. A keyless entry system for an automotive vehicle lock device for selectably actuating the lock device to either of a first locked position and a second unlocked position, comprising:
    an electrical actuator associated with said lock device and responsive to a control signal to reverse the position of said lock device;
    a manual switch;
    a transmitter for transmitting a radio signal indicative of a unique code which identifies the transmitter, when said manual switch is operated and in response to a demand signal received by the transmitter;
    a controller producing said demand signal in response to manual operation of said manual switch for activating said transmitter, said controller operable for receiving said radio signal from said transmitter, comparing the unique code indicated by said radio signal with a preset code, and producing said control signal when said unique code matches said preset code; and
    a transmitter-locking alarm means, associated with said controller, for detecting when said transmitter is locked in the vehicle and producing an alarm in such cases, said transmitter-locking alarm means comprising a signal level detector responsive to signal level variations in said radio signal within a given period of time said alarm means producing said alarm signal when the overall change in said radio signal level over said given period of time is less than a predetermined value.

9. The keyless entry system as set forth in claim 8, wherein said alarm means produces said alarm signal when said radio signal level is substantially unchanged.

10. The keyless entry system as set forth in claim 9, wherein said transmitter-locking alarm means includes a detector for detecting actuation of a door lock device to the locked state from the unlocked state, and enabling said signal level detector when the door lock device is actuated to the locked state from the unlocked state.

11. The keyless entry system as set forth in claim 10, wherein said transmitter and said controller each includes an antenna and wherein electromagnetic induction between said antennas allows transmission of said radio signal.

12. The keyless entry system as set forth in claim 11, wherein said transmitter is small enough to fit in a clothing pocket.

13. A keyless entry system for an automotive vehicle for operating one of a plurality of vehicle devices including a door lock device which is selectively operated to either a first locked position and a second unlocked position, comprising:
    a plurality of electrical actuators respectively associated with the corresponding vehicle devices and responsive to a control signal to operate said corresponding vehicle device to a desired position, said actuators including a door lock actuator for operating a vehicular door lock between a first locked position and a second unlocked position;
    a plurality of manual switches, each operating one of the corresponding vehicle devices, said manual switches including a door lock switch manually operable for reversing the position of said door lock actuator between said first locked position and said second unlocked position;
    a detector for detecting the first locked position of the door to produce a detector signal;
    a transmitter operable in response to each of a first and second demand signal to output a first and second radio signal, respectively, each radio signal indicative of a unique code which identifies the transmitter;

a controller producing a first demand signal in response to manual operation of one of said manual switches, and operable for receiving said first radio signal from said transmitter, comparing the unique code indicated by said first radio signal with a preset code, and producing said control signal when said unique code matches said preset code, said controller including means responsive to manual operation of one of said manual switches for identifying one of said actuators and operating said identified actuator for operating one of the vehicle devices corresponding to the manual switch operated, said controller being responsive to said detector signal for producing a second demand signal for testing whether a second radio signal is received in response thereto, and detecting said second radio signal in a period of time longer than a given period after transmitting said second signal for producing an alarm signal; and a transmitter-locking alarm means, associated with said controller, and producing an alarm in response to said alarm signal.

14. The keyless entry system as set forth in claim 13, wherein said transmitter is portable and said controller is mounted on a vehicle and associated with said manual switches, and said first and second demand signals are other radio signals transmitted from said controller to said transmitter.

15. The keyless entry system as set forth in claim 14, wherein said transmitter and said controller each include an antenna and wherein electromagnetic induction between said antennae allows transmission of said radio and other radio signals.

16. The keyless entry sytem as set forth in claim 15, wherein said transmitter is small enough to fit in a clothing pocket.

17. The keyless entry system as set forth in claim 13, wherein said transmitter-locking alarm means comprises a signal level detector responsive to signal level variations in said second radio signal within a given period of time to produce said alarm signal when the overall change in said second radio signal level over said given period of time is less than a predetermined value.

18. The keyless entry system as set forth in claim 17, wherein said signal level detector produces said alarm signal when said second radio signal level is substantially unchanged.

* * * * *